2,789,972

INTERPOLYCARBONATES FROM 4,4'-BIS(β-HYDROXYETHYL)BIPHENYL-BIS (ALKYL OR ARYL CARBONATES)

Delbert D. Reynolds and Kenneth R. Dunham, Rochester, N. Y., assignors to Eastman Kodak Company, Rochester, N. Y., a corporation of New Jersey No Drawing. Application February 2, 1954,
Serial No. 407,804

18 Claims. (Cl. 260—77.5)

This invention relates to highly polymeric linear interpolycarbonates prepared by the self-condensation in the presence of an ester-interchange catalyst of a 4,4'-bis(β-hydroxyethyl)-biphenyl-bis-(alkyl or aryl carbonate) mixed together with another copolymerizable bis-carbonate) monomer as described below. These starting materials are hereinafter collectively referred to as bis-(carbonate) monomers and separately referred to as either primary or as copolymerizable bis-(carbonate) monomers. This invention also includes interpolycarbonates prepared when employing mixtures of several of these primary bis-(carbonate) monomers or of the copolymerizable bis-carbonate) monomers. Furthermore, this invention relates to the processes involved in preparing the polymers.

It is an object of this invention to provide unusually superior highly polymeric linear interpolymercarbonates which are valuable in preparing fibers, film, etc. as described herein. An additional object of this invention resides in providing a process for converting the mixed starting materials into the interpolycarbonates. Other objects will become apparent hereinafter.

Linear polycarbonates prepared by the self-condensation of a 4,4'-bis(β-hydroxyethyl)-biphenyl-bis-(alkyl or aryl carbonate) or mixtures thereof have been described in our copending application filed in December 8, 1953, Serial No. 397,038. The products of the previously filed application are highly polymeric polycarbonates which possess high intrinsic viscosity and high melting points such that they can be extruded to form films, fibers and the like which can be mechanically worked and heat-set to form molecularly oriented structures. However, these polycarbonates are characterized by their rapid rate of crystallization. As a result they caniot be quenched by ordinary means with sufficient speed to halt their inherently rapid rate of crystallization.

In order for a linear polymer to be readily fabricated into a film or fiber which can be molecularly oriented, it is necessary that the rate of crystallization of the extruded material be such that the material can be extruded and quenched to yield an amorphous fiber or film. Such amorphous products can then be mechanically and thermally treated to yield molecularly oriented products. The quenching should ordinarily be capable of being accomplished in air, or in a liquid such as water or an organic liquid which is not a solvent for the polymer. If the polymeric material is not properly quenched to form an amorphous material, then the polymeric material acquires a crystalline, brittle character and cannot be satisfactorily worked mechanically due to the tendency toward breaking.

We have now found that certain interpolycarbonates can be prepared which possess a rate of crystallization such that an extruded film or fiber can be readily quenched by ordinary commercial means to create a substantially amorphous molecular structure within the material. For example, an extruded film having a thickness on the order of about 0.05 inch can be prepared from the interpolyesters of this invention which can be quenched in water to create a substantially amorphous product.

The novel interpolycarbonates of this invention can be prepared by a process which comprises (A) co-condensing a mixture consisting of at least 5 mole percent of a primary bis-(carbonate) monomer having the following formula:

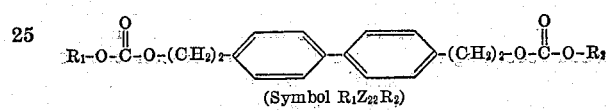

(Symbol R₁Z₂₂R₂)

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer having one of the following formulas and which is employed in no greater proportion than the mole percentage indicated:

| Chemical Formula | Max. Percent | Symbol |
|---|---|---|
| R₁O—CO—O—R₃—O—CO—OR₂ | 50 | None. |
| R₁O—CO—O—(CH₂)ₓ—O—⟨⟩—O—(CH₂)ₓ—O—CO—OR₂ | 50 | R₁Z₁₀₀R₂. |
| R₁O—CO—O—(CH₂)ₓ—O—⟨⟩—SO₂—⟨⟩—O—(CH₂)ₓ—O—CO—OR₂ | 40 | R₁Z₃₋₁₀₀R₂. |
| R₁O—CO—O—CH₂—⟨⟩—CH₂—O—CO—OR₂ | 95 | R₁Z₁₁R₂. |
| R₁O—CO—O—(CH₂)ₓ—O—⟨⟩—⟨⟩—O—(CH₂)ₓ—O—CO—OR₂ | 95 | R₁Z₁₀₂R₂. | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (B) in the presence of an ester-interchange catalyst containing titanium as the metallic element, which catalyst can be selected from the group consisting of Ti(OR')₄, TiX₄, and ether complexes of TiX₄ wherein the ether complexes are derived by reacting TiX₄ with an ether selected from the group consisting of aliphatic and alicyclic ethers containing from 2 to 12 carbon atoms, and wherein $R'$ represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

The symbols presented above are set forth in order to provide a convenient way in which to refer to the various copolymerizable bis-(carbonate) monomers without having to set forth the entire formula or chemical name on each occasion. No symbols are used for the aliphatic bis-(carbonates) since the names of these compounds are not especially complex. The symbol $Z_{11}$ represents a symmetrical bis-(carbonate) as indicated above wherein there is one (the first number in the subscript) benzene ring which is directly connected at the 1 and 4 positions to one (the second number in the subscript) methylene radical. The symbol $Z_{202}$ has a similar connotation wherein there are 2 benzene rings connected at the 4 and 4'-positions through an O atom to two methylene radicals, i. e. an ethylene radical. Symbol $Z_{S-202}$ connotes a sulfonyl radical between 2 benzene rings which are connected at the 4 and 4'-positions through an O atom to two methylene radicals, i. e. an ethylene radical. The other symbols have analogous connotations.

The $R_1$ and $R_2$ portions of these symbols further represent the nature of the ester. Thus, 1,4-bis-($\beta$-hydroxyethyl)-benzene-bis(n-propylcarbonate) has the symbol n-$C_3H_7Z_{12}$. The significance of $R_1$ is not repeated twice if $R_2$ is the same as $R_1$ as is usually the case.

It can readily be seen from the description of the process that there is no problem involved in adjusting the ratio of carbonate constituent to dihydroxy (glycol) constituent in the reaction vessel since the polycarbonates are produced according to this invention by the co-condensation of only one type of starting material. This establishes the composition of the polycarbonate produced since there can be no variation in the proportion of carbonate and glycol constituents. Moreover, the nature of this process makes it admirably suited to conducting the process on a continuous basis since no problems are involved in maintaining critical proportions of reactants.

Examples of the primary class of starting materials, i. e. the primary bis-(carbonate) monomers which can be used in the process of this invention include 4,4'-bis-($\beta$-hydroxyethyl)-biphenyl-bis-(ethyl carbonate), i. e. $C_2H_5Z_{22}$; 4,4'-bis($\beta$-hydroxyethyl) - biphenyl-bis-(p-tolyl carbonate), i. e. p-$CH_3C_6H_5Z_{22}$; 4,4'-bis-($\beta$-hydroxyethyl)-biphenyl-bis-(phenyl carbonate), i. e. $C_6H_5Z_{22}$; 4,4'-bis-($\beta$-hydroxyethyl)-biphenyl - bis-(n-butyl carbonate), i. e. n-$C_4H_9Z_{22}$; 4,4'-bis-($\beta$-hydroxyethyl)-biphenyl-bis-(isopropyl carbonate), i-$C_3H_5Z_{12}$; 4,4'-bis-($\beta$-hydroxyethyl)-biphenyl-bis-(methyl carbonate), $CH_3Z_{22}$; etc.

Examples of the copolymerizable bis-(carbonate) monomers which can be used in the proces of this invention include:

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only certain compounds of titanium can be satisfactorily employed as catalysts to produce the polyesters of this invention. Other compounds, even including some compounds of titanium, which are well recognized ester-interchange catalysts promote the degradation of the starting material with the formation of ethylenic unsaturation and cross-linking. This aspect of the invention is discussed in greater detail hereinbelow.

The titanium catalysts described above can be advantageously employed in an amount of from about 0.005% to about 0.2% by weight based on the weight of the bis-(carbonate) monomer being condensed. Higher or lower percentages can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from stage I into stage II. The principle distinction between the so-called two stages lies in the fact that during stage II, the pressure of the adjacent atmosphere under which the condensation is performed is greatly reduced. Although the temperature can remain the same for both the first and the second stage, it is advantageous to employ a samewhat higher temperature at about the same time the pressure is reduced, especially when the liquid phase process is being employed. The temperatures used during the latter part of stage II can advantageously be at least 250° C. or higher; the maximum temperature which can be employed is determined by the tendency of the interpolycarbonate to decompose at extremely high temperatures. As a practical matter, it is most advantageous to employ a maximum temperature of not much

| Chemical Formula | Symbol |
| --- | --- |
| $C_2H_5O-CO-O-(CH_2)_2-O-CO-OC_2H_5$ | none. |
| $C_2H_5O-CO-O-CH_2-\langle\phantom{O}\rangle-CH_2-O-CO-OC_3H_7$ | $C_2H_5Z_{11}C_3H_7$. |
| $CH_3-\langle\phantom{O}\rangle-O-CO-O-CH_2-\langle\phantom{O}\rangle-CH_2-O-CO-O-\langle\phantom{O}\rangle-CH_3$ | p-$CH_3C_6H_4Z_{11}$. |
| $C_3H_7O-CO-O-CH_2-\langle\phantom{O}\rangle-CH_2-O-CO-OC_3H_7$ | n$C_3H_7Z_{11}$. |
| $CH_3O-CO-O-(CH_2)_2-O-\langle\phantom{O}\rangle-O-(CH_2)_2-O-CO-OCH_3$ | $CH_3Z_{102}$. |
| $C_2H_5O-CO-O-(CH_2)_2-O-\langle\phantom{O}\rangle-O-(CH_2)_2-O-CO-OC_2H_5$ | $C_2H_5Z_{102}$. |
| $CH_3O-CO-O-(CH_2)_2-O-\langle\phantom{O}\rangle-\langle\phantom{O}\rangle-O-(CH_2)_2-O-CO-OCH_3$ | $CH_3Z_{202}$. |
| $\langle\phantom{O}\rangle-O-CO-O-(CH_2)_2-O-\langle\phantom{O}\rangle-SO_2-\langle\phantom{O}\rangle-O-(CH_2)_2-O-CO-O-\langle\phantom{O}\rangle$ | $C_6H_5Z_{S-202}$. | et cetera.

more than about 250° C. When a solid phase process is employed, the maximum temperature can be restricted to much lower temperatures, although the time required to accomplish the production of desirable linear polymeric polycarbonate may be increased accordingly.

The reduced pressure which is employed during stage II of the condensation is advantageously less than about 15 mm. of Hg of pressure or less. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one half to 4 to 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of heat throughout the reaction mixture and to otherwise facilitate the condensation. However, this is not essential especially when small quantities of mixed bis-(carbonate) monomers are being condensed. During the course of the reaction, an alkyl ester and/or an aryl ester of carbonic acid will be evolved as a gas, as indicated hereinabove. Stirring facilitates the removal of such an ester in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline interpolycarbonates having melting points above about 100° C., high intrinsic viscosities and always containing at least 5 mole percent of the following repeating units:

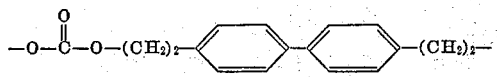

wherein the units are connected by ester linkages either to an identical unit or to a copolymerizable unit having one of the following formulas:

percent is specified for the proportion of the copolymerizable unit in the interpolycarbonate.

In this specification all intrinsic viscosities are measured by standard procedures employing solutions in 60% phenol-40% sym. tetrachlorethane. The melting points of the interpolycarbonates described in the examples hereinbelow were all at least 110° C. or higher.

The interpolycarbonates of this invention can be prepared by various continuous processes employing many types of apparatus known to be useful in conducting various related continuous processes as described in the prior art, for example, the method described in U. S. 2,647,885 can be suitably adapted. For another example reference is made to application, Serial No. 397,040, filed on December 8, 1953.

The primary bis-(carbonate) monomers employed in accordance with this invention can be prepared by condensing an alkyl or an aryl chlorocarbonate with 4,4'-bis-(β-hydroxyethyl)-biphenyl in the presence of pyridine. Although it is advantageous to carry out this condensation in a tertiary amine such as pyridine, other acid-binding agents can also be employed. This process is described in our copending application, Serial No. 397,037, filed on December 8, 1953. The preparation of the copolymerizable bis-(carbonate) monomers is analogous to this process and is described in other related applications filed on December 8, 1953.

The primary bis-(carbonate) monomer and various copolymerizable bis-(carbonate) monomers yield interpolycarbonates having an unstable structure in the presence of most ester-interchange catalysts whereby they decompose forming various undesirable products. This situation demonstrates the unusual advantages of employing the titanium catalysts covered by the applicants' invention. Several of the following examples illustrate the employment of titanium butoxide as the catalyst.

Titanium butoxide and many of its homologs are thick liquids. One drop weighs about 0.015 gram and contains about 0.0002 equivalent of titanium. It is sometimes advantageous to dissolve this compound or some of the other titanium compounds in an alcohol to facilitate handling the catalyst.

Another titanium compound which has been found to be useful is titanium tetrachloride. Titanium tetrachloride is difficult to handle because of its rapid reaction with the moisture in the air. It has, therefore, been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding

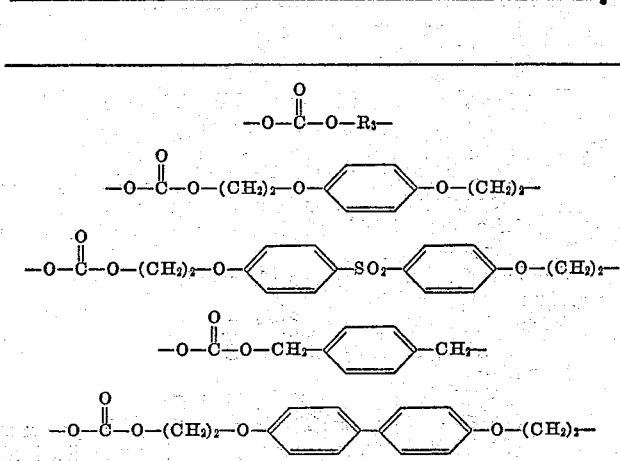

wherein $R_3$ represents an alkylene radical containing from 4 to 10 carbon atoms, and the maximum mole titanium tetrachloride slowly to an excess of the ether. It is advantageous to maintain the ether at ambient temperatures (20°–30° C.) or lower during this addition. Examples regarding the preparation of these ether complexes are presented in our copending application, Serial No. 397,037, filed on December 8, 1953.

It is believed that the examples set forth in our copending application, Serial No. 397,037, make it quite clearly apparent that the specified titanium catalysts are essential to the preparation of linear highly polymeric crystalline polycarbonates when self-condensing the primary bis-(carbonate) monomers; the same can obviously be said of the mixed bis-(carbonate) monomers of this invention. Other catalysts such as the alkali metal and the alkaline earth metal alkoxides are either inoperative or are strikingly inferior to these titanium compounds as catalysts.

The interpolycarbonates of our invention can be further illustrated by the various working examples set forth below in somewhat tabular style. The reactants are set forth by name and by symbol to facilitate a comprehension of the interpolycarbonate being produced. The mole percentages are also indicated.

In each working example the primary bis-(carbonate) monomer and the copolymerizable bis-(carbonate) monomer were mixed together and the indicated catalyst was added in the specified amount. The reactants were heated and nitrogen (or other specified inert gas) was bubbled through the melt during stage I. The temperature is set forth which is the same for both stage I and stage II unless otherwise indicated. The time for each stage is also set forth. The alkyl or aryl carbonate which formed during the course of stage I was allowed to escape or was collected by means of a condenser in working examples where fairly large quantities of reactants were involved. Stage I was considered as reaching an end when the condensation had proceeded to a point where further heating under a vacuum would not be capable of removing an appreciable amount of either of the bis-(carbonate) monomers being condensed. Stage II was then begun by attaching a vacuum pump to the reaction vessel and closing off the inlet for the inert gas. The reduced pressure employed was from 0.1 to 1 mm. of Hg pressure. This reduced pressure was maintained for the remainder of stage II. During stage II the alkyl or aryl carbonate which formed was condensed in at least one Dry Ice-acetone trap which was placed between the reaction vessel and the vacuum pump.

Catalysts employed in the working examples included titanium butoxide as such and also included a solution of titanium butoxide prepared by dissolving 2 cc. of titanium butoxide in 18 cc. of n-butyl alcohol.

*Example 1.—90% $Z_{22}$ plus 10% 1,4-butanediol-bis-(ethyl carbonate)*

Reactants:
    4,4'-bis($\beta$-hydroxyethyl)biphenyl-bis-(ethyl carbonate) (11.5 g. or 90 mol percent)
    1,4-butanediol-bis(ethyl carbonate) (0.78 g. or 10 mol percent)
Catalyst: 0.3 cc. Ti butoxide solution.
Time:
    I Stage, 45 minutes, 250° C.
    II Stage, 75 minutes, 250° C.
Remarks:
    (1) Smooth, clear melt at 250° C.
    (2) Crystallized upon cooling to yield a hard, white, brittle polymer
    (3) Intrinsic viscosity, 0.43
    (4) Melting point, 215° C.

In Example 1 and those which follow up through Example 22, the symbol $Z_{22}$ in the titles of these examples is to be considered as representing the bis-(ethyl carbonate).

*Example 2.—80% $Z_{22}$ plus 10% 1,4-butanediol-bis-(ethyl carbonate)*

Reactants:
    4,4' - bis($\beta$-hydroxyethyl)biphenyl-bis(ethyl carbonate) (10.3 g. or 80 mol percent)
    1,4-butanediol-bis(ethyl carbonate) (1.56 g. or 20 mol percent)
Catalyst: 0.3 cc. Ti butoxide solution
Time:
    I Stage, 45 minutes, 250° C.
    II Stage, 75 minutes, 250° C.
Remarks:
    (1) Clear, smooth melt
    (2) Threads pulled from the melt was somewhat brittle
    (3) Polymeric mass crystallized to a hard porcelain-like product
    (4) Intrinsic viscosity 0.45
    (5) Melting point, 200° C.

*Example 3.—70% $Z_{22}$ plus 30% 1,4-butanediol-bis-(ethyl carbonate)*

Reactants:
    4,4' - bis($\beta$-hydroxyethyl)biphenyl-bis(ethyl carbonate) (9.0 g. or 70 mol percent)
    1,4-butanediol-bis(ethyl carbonate) (2.3 g. or 30 mol percent)
Catalyst: 0.3 cc. Ti butoxide solution
Time:
    I Stage, 45 minutes, 250° C.
    II Stage, 60 minutes, 250° C.
Remarks:
    (1) Clear, smooth melt
    (2) Crystallized to a white porcelain-like polymer
    (3) Brittle
    (4) Intrinsic viscosity 0.42
    (5) Melting point, 175° C.

*Example 4.—50% $Z_{22}$ plus 50% 1,4-butanediol-bis-(ethyl carbonate)*

Reactants:
    4,4' - bis($\beta$ - hydroxyethyl)biphenyl - bis(ethyl carbonate) (9.0 g. or 50 mol percent)
    1,4-butanediol-bis(ethyl carbonate) (5.4 g. or 50 mol percent)
Catalyst: 0.3 cc. Ti butoxide solution
Time:
    I Stage, 45 minutes, 250° C.
    II Stage, 75 minutes, 250° C.
Remarks:
    (1) Crystallized to a white, flexible, tough polymer
    (2) Threads cold draw to give soft fibers
    (3) Polymer has a hard wax-like feel
    (4) Intrinsic viscosity .34
    (5) Melting point, 150° C.

*Example 5.—90% $Z_{22}$ plus 10% 1,5-pentanediol-bis-(ethyl carbonate)*

Reactants:
    4,4' - bis($\beta$ - hydroxyethyl)biphenyl - bis(ethyl carbonate) (11.5 g. or 90 mol percent)
    1,5-pentanediol-bis(ethyl carbonate) (0.83 g. or 10 mol percent)
Catalyst: 0.3 cc. of Ti butoxide solution
Time:
    I Stage, 45 minutes, 270° C.
    II Stage, 15 minutes, 270° C.
Remarks:
    (1) Clear, smooth melt at 270° C.
    (2) Crystallized rapidly to a brittle, white polymer
    (3) Threads pulled from the melt crystallized in air and were somewhat brittle
    (4) Intrinsic viscosity, .44
    (5) Melting point, 235° C.

*Example 6.—80% $Z_{22}$ plus 20% 1,5-pentanediol-bis-(ethyl carbonate)*

Reactants:
4,4' - bis($\beta$ - hydroxyethyl)biphenyl - bis(ethyl carbonate) (10.3 g. or 80 mol percent)
1,5-pentanediol-bis(ethyl carbonate) (1.65 g. or 20 mol percent)
Catalyst: 0.3 cc. Ti butoxide solution
Time:
  I Stage, 45 minutes, 250° C.
  II Stage, 60 minutes, 250° C.
Remarks:
  (1) Clear, smooth melt which crystallized upon cooling to yield a white, hard, brittle polymer
  (2) Threads pulled from melt crystallized less rapidly than those from Example 5. They cold draw.
  (3) Intrinsic viscosity .41
  (4) Melting point 190° C.

*Example 7.—70% $Z_{22}$ plus 30% 1,5-pentanediol-bis-(ethyl carbonate)*

Reactants:
4,4' - bis($\beta$ - hydroxyethyl)biphenyl - bis(ethyl carbonate) (9.0 g. or 70 mol percent)
1,5-pentanediol-bis(ethyl carbonate) (2.5 g. or 30 mol percent)
Catalyst: 0.3 cc. Ti butoxide solution
Time:
  I Stage, 45 minutes, 250° C.
  II Stage, 60 minutes, 250° C.
Remarks:
  (1) Smooth, clear melt at 250° C.
  (2) Crystallizes to a white, hard, brittle polymer
  (3) Intrinsic viscosity .38
  (4) Melting point, 180° C.

*Example 8.—50% $Z_{22}$ plus 50% 1,5-petanediol-bis-(ethyl carbonate)*

Reactants:
4,4' - bis($\beta$ - hydroxyethyl)biphenyl - bis(ethyl carbonate) (9.0 g. or 50 mol percent)
1,5-pentanediol-bis(ethyl carbonate) (5.8 g. or 50 mol percent)
Catalyst: 0.3 cc. Ti butoxide solution
Time:
  I Stage, 45 minutes, 250° C.
  II Stage, 60 minutes, 250° C.
Remarks:
  (1) Clear, smooth melt
  (2) Crystallized more slowly than the above polymers of the pentanediol series
  (3) Threads cold draw to give soft fibers
  (4) The crystallized polymer has a tough, waxy feel
  (5) Intrinsic viscosity .39
  (6) Melting point, 150° C.

*Example 9.—95% $Z_{22}$ plus 5% 1,6-hexanediol-bis-(ethyl carbonate)*

Reactants:
4,4' - bis($\beta$ - hydroxyethyl)biphenyl - bis(ethyl carbonate) (12.2 g. or 95 mol percent)
1,6-hexanediol-bis(ethyl carbonate) (0.44 g. or 5 mol percent)
Catalyst: 0.3 cc. Ti butoxide solution
Time:
  I Stage, 45 minutes, 270° C.
  II Stage, 75 minutes, 270° C.
Remarks:
  (1) At 270° C. the melt is stiff. It crystallized upon cooling to a white, hard, brittle polymer.
  (2) Intrinsic viscosity .56
  (3) Melting point, 230° C.

*Example 10.—95% $Z_{22}$ plus 5% 1,6-hexanediol-bis-(ethyl carbonate)*

The procedure described in Example 9 was repeated exactly except that the temperature employed was 250° instead of 270° C. The product crystallized at this temperature to yield a white, hard polymer.

*Example 11.—95% $Z_{22}$ plus 5% 1,6-hexanediol-bis-(ethyl carbonate)*

The procedure described in Example 9 was repeated exactly except that the temperature employed was 250° C. during the first stage instead of 270° C. The product was essentially the same as in Example 9.

*Example 12.—95% $Z_{22}$ plus 5% 1,6-hexanediol-bis-(ethyl carbonate)*

The procedure described in Example 9 was repeated exactly except that the temperature employed was 250° C. during the first stage instead of 270° C. and the catalyst employed was Ti ethoxide instead of Ti butoxide. The same volumetric amount of Ti ethoxide solution was employed. This solution was prepared by dissolving 2 cc. of Ti ethoxide in 18 cc. of ethanol.

*Example 13.—90% $Z_{22}$ plus 10% 1,6 hexanediol-bis-(ethyl carbonate)*

Reactants:
4,4'-bis($\beta$ - hydroxyethyl)biphenyl-bis(ethyl carbonate) (11.5 g. or 90 mol percent)
1,6-hexanediol-bis(ethyl carbonate) (0.87 g. or 10 mol percent)
Catalyst: 0.3 cc. Ti butoxide solution
Time:
  I Stage, 45 minutes, 250° C.
  II Stage, 75 minutes, 250° C.
Remarks:
  (1) Began to crystallize at 250° C. after 15 minutes of second stage and set to a white solid after 45 minutes.
  (2) The reaction was continued in the solid state.
  (3) Product was similar in appearance to that from Example 9
  (4) Intrinsic viscosity .38
  (5) Melting point, 225° C.

*Example 14.—80% $Z_{22}$ plus 20% 1,6 hexanediol-bis-(ethyl carbonate)*

Reactants:
4,4'-bis($\beta$ - hydroxyethyl)biphenyl-bis(ethyl carbonate) (10.3 g. or 80 mol percent)
1,6-hexanediol-bis(ethyl carbonate) (1.7 g. or 20 mol percent)
Catalyst: 0.3 cc. Ti butoxide solution
Time:
  I Stage, 45 minutes, 250° C.
  II Stage, 75 minutes, 250° C.
Remarks:
  (1) Smooth melt at 250° C.
  (2) Threads pulled from melt crystallized rapidly in air.
  (3) Too brittle to cold draw very well
  (4) Polymer is hard, white and brittle
  (5) Intrinsic viscosity .47
  (6) Melting point, 205° C.

*Example 15.—70% $Z_{22}$ plus 30% 1,6 hexanediol-bis-(ethyl carbonate)*

Reactants:
4,4'-bis($\beta$ - hydroxyethyl)biphenyl-bis(ethyl carbonate) (9.0 g. or 70 mol percent)
1,6-hexanediol-bis(ethyl carbonate) (2.6 g. or 30 mol percent)
Catalyst: 0.3 cc. Ti butoxide solution
Time:
  I Stage, 45 minutes, 250° C.
  II Stage, 60 minutes, 250° C.

Remarks:
(1) Smooth, clear melt from which threads were pulled
(2) Threads cold draw
(3) Mass crystallized to a white, brittle solid
(4) Intrinsic viscosity .41
(5) Melting point, 180° C.

*Example 16.—60% $Z_{22}$ plus 40% 1,6 hexanediol-bis-(ethyl carbonate)*

Reactants:
4,4'-bis($\beta$ - hydroxyethyl)biphenyl-bis(ethyl carbonate) (7.7 g. or 60 mol percent)
1,6-hexanediol-bis(ethyl carbonate)
Catalyst: 0.3 cc. Ti butoxide solution
Time:
I Stage, 45 minutes, 250° C.
II Stage, 60 minutes, 250° C.
Remarks:
(1) Clear, smooth melt at 250° C.
(2) Threads drawn from the melt can be cold drawn
(3) Mass of polymer crystallized to a white, tough flexible polymer
(4) Physical properties appear to be bordering those of a hard, tough wax
(5) Intrinsic viscosity .45
(6) Melting point, 160° C.

*Example 17.—50% $Z_{22}$ plus 50% 1,6-hexanediol-bis-(ethyl carbonate)*

Reactants:
4,4'-bis($\beta$ - hydroxyethyl)biphenyl-bis(ethyl carbonate) (7.7 g. or 50 mol percent)
1,6-hexanediol-bis(ethyl carbonate) (3.5 g. or 50 mol percent)
Catalyst: 0.3 cc. Ti butoxide solution
Time:
I Stage, 45 minutes, 250° C.
II Stage, 75 minutes, 250° C.
Remarks:
(1) Smooth melt crystallized nicely to a white, flexible polymer which had a waxy feel to the bite
(2) It crystallized more slowly than any of the above member of the hexanediol series
(3) Intrinsic viscosity .45
(4) Melting point, 150° C.

*Example 18.—95% $Z_{22}$ plus 5% 1,10-decanediol-bis-(ethyl carbonate)*

Reactants:
4,4'-bis($\beta$ - hydroxyethyl)biphenyl-bis(ethyl carbonate) (12.2 g. or 95 mol percent)
1,10-decanediol-bis(ethyl carbonate) (0.53 g. or 5 mol percent)
Catalyst: 0.3 cc. Ti butoxide solution
Time:
I Stage, 45 minutes, 270° C.
II Stage, 75 minutes, 270° C.
Remarks:
(1) Clear melt but was stiff so that fibers did not pull well from it
(2) Crystallized rapidly to a white, brittle polymer
(3) Intrinsic viscosity .55
(4) Melting point 230° C.

*Example 19.—80% $Z_{22}$ plus 20% 1,10-decanediol-bis-(ethyl carbonate)*

Reactants:
4,4'-bis($\beta$ - hydroxyethyl)biphenyl-bis(ethyl carbonate) (10.3 g. or 80 mol percent)
1,10-decanediol-bis(ethyl carbonate) (2.12 g. or 20 mol percent)
Catalyst: 0.3 cc. Ti butoxide
Time:
I Stage, 45 minutes, 250° C.
II Stage, 75 minutes, 250° C.

Remarks:
(1) Clear, colorless melt from which threads were pulled
(2) Threads tended to crystallize in air and were too brittle to cold draw very well
(3) Intrinsic viscosity .42
(4) Melting point 205° C.

*Example 20.—70% $Z_{22}$ plus 30% 1,10-decanediol-bis-(ethyl carbonate)*

Reactants:
4,4'-bis($\beta$ - hydroxyethyl)biphenyl-bis(ethyl carbonate) (9.0 g. or 70 mol percent)
1,10-decanediol-bis(ethyl carbonate) (3.2 g. or 30 mol percent)
Catalyst: 0.3 cc. Ti butoxide
Time:
I Stage, 45 minutes, 250° C.
II Stage, 60 minutes, 250° C.
Remarks:
(1) Smooth clear melt
(2) Crystallizes to a white, brittle polymer
(3) Threads pulled from melt were not quenched quite fast enough by air and hence did not cold draw well
(4) Intrinsic viscosity .42
(5) Melting point 180° C.

*Example 21.—50% $Z_{22}$ plus 50% 1,10-decanediol-bis-(ethyl carbonate)*

Reactants:
4,4'-bis($\beta$ - hydroxyethyl)biphenyl-bis(ethyl carbonate) (9.0 g. or 50 mol percent)
1,10-decanediol-bis(ethyl carbonate) (7.4 g. or 50 mol percent)
Catalyst: 0.3 cc. Ti butoxide solution
Time:
I Stage, 45 minutes, 250° C.
II Stage, 75 minutes, 250° C.
Remarks:
(1) Clear melt which crystallizes to a white, flexible polymer with a waxy feel.
(2) Tough
(3) Intrinsic viscosity .43
(4) Melting point 150° C.

*Example 22.—50% $Z_{22}$ plus 50%, 1,10-decanediol-bis-(ethyl carbonate)*

The procedure described in Example 21 was repeated exactly except that the primary bis-(carbonate) monomer was an equivalent amount of phenyl $Z_{22}$ instead of ethyl $Z_{22}$. The product obtained was essentially identical to that described in Example 21.

*Example 23.—95% ethyl $Z_{22}$ plus 5% ethyl $Z_{102}$*

Reactants:
4,4'-bis-($\beta$-hydroxyethyl)-biphenyl-bis - (ethyl carbonate) (6.1 g. or 95 mol percent)
1,4-bis-($\beta$-hydroxyethoxy)-benzene-bis - (ethyl carbonate) (0.29 g. or 5 mol percent)
Catalyst:
0.3 cc. of Ti butoxide solution
Time:
I Stage, 20 minutes, 270° C.
II Stage, 55 minutes, 270° C.
Remarks:
(1) Clear melt at 270° C.
(2) When cooled it crystallized to a white porcelain-like material.
(3) Threads crystallized in air
(4) Intrinsic viscosity, 0.39
(5) Melting point, 261° C.

*Example 24.—90% ethyl $Z_{22}$ plus 10% ethyl $Z_{102}$*

Reactants:
    4,4'-bis-($\beta$-hydroxyethyl)-biphenyl-bis - (ethyl carbonate) (5.8 g. or 90 mol percent)
    1,4-bis-($\beta$-hydroxyethoxy)-benzene-bis - (ethyl carbonate) (0.57 g. or 10 mol percent)

Catalyst:
    0.3 cc. of Ti butoxide solution

Time:
    I Stage, 20 minutes, 270° C.
    II Stage, 55 minutes, 270° C.

Remarks:
    (1) Clear melt at 270° C.
    (2) Crystallized to a white porcelain-like polymer
    (3) Threads pulled from melt crystallized in air
    (4) Intrinsic viscosity 0.37
    (5) Melting point, 250° C.

*Example 25.—80% ethyl $Z_{22}$ plus 20% ethyl $Z_{102}$*

Reactants:
    4,4'-bis-($\beta$-hydroxyethyl)-biphenyl-bis - (ethyl carbonate) (5.1 g. or 80 mol percent)
    1,4-bis-($\beta$-hydroxyethoxy)-benzene-bis - (ethyl carbonate) (1.1 g. or 20 mol percent)

Catalyst:
    0.3 cc. Ti butoxide solution

Time:
    I Stage, 20 minutes, 270° C.
    II Stage, 55 minutes, 270° C.

Remarks:
    (1) Clear melt at 270° C.
    (2) Crystallized to a white, porcelain-like polymer
    (3) Rate of crystallization was noticeably slower than that in the two previous examples.
    (4) Intrinsic viscosity 0.36
    (5) Melting point, 237° C.

*Example 26.—80% ethyl $Z_{22}$ plus 20% ethyl $Z_{102}$*

The procedure described in Example 25 was repeated exactly except that the reactants and catalyst were employed in 100 times the quantity and the following conditions were different:

Time:
    I Stage, 35 minutes, 230° C.
    II Stage, 80 minutes, 260° C.

The reaction was conducted with continuous stirring. The product was essentially the same as in Example 25 and possessed a higher intrinsic viscosity. This melt was extruded as a film having a thickness of 0.05 inch which became satisfactorily quenched in water to form an amorphous product. This film was then drawn in perpendicular directions along the plane of the film so as to form a molecularly oriented structure which was heat set to produce a sheet or film product having excellent properties suitable for use as wrapping material, photographic film, etc.

*Example 27.—80% ethyl $Z_{22}$ plus 20% ethyl $Z_{102}$*

The procedure described in Example 26 was repeated except that the catalyst was 30 cc. of Ti ethoxide solution (see Example 12). The product obtained was essentially the same.

*Example 28.—80% ethyl $Z_{22}$ plus 20% ethyl $Z_{102}$*

The procedure described in Example 26 was repeated except that the catalyst was 1.0 cc. of Ti tetrachloride instead of the solution of Ti butoxide. The product obtained was essentially the same.

*Example 29.—50% ethyl $Z_{22}$ plus 50% ethyl $Z_{102}$*

Reactants:
    4,4'-bis-($\beta$-hydroxyethyl)-biphenyl-bis - (ethyl carbonate) (4.5 g. or 50 mol percent)
    1,4-bis-($\beta$-hydroxyethoxy)-benzene-bis - (ethyl carbonate) (2.9 g. or 50 mol percent)

Catalyst:
    0.3 cc. of Ti butoxide solution

Time:
    I Stage, 20 minutes, 270° C.
    II Stage, 60 minutes, 270° C.

Remarks:
    (1) Clear melt at 270° C.
    (2) Thin films and threads pulled from the melt were readily air quenched.
    (3) Main mass crystallized to a white, porcelain-like polymer.
    (4) Intrinsic viscosity, 0.37
    (5) Melting point, 173° C.

*Example 30.—95% ethyl $Z_{22}$ and 5% ethyl $Z_{s-202}$*

Reactants:
    4,4'-bis-($\beta$-hydroxyethyl)-biphenyl-bis - (ethyl carbonate) (6.1 g. or 95 mol percent)
    4,4'-bis-($\beta$-hydroxyethoxy)- diphenylsulfone - bis - (ethyl carbonate) (0.40 g. or 5 mol percent)

Catalyst:
    0.3 cc. of Ti butoxide solution

Time:
    I Stage, 20 minutes, 270° C.
    II Stage, 25 minutes, 270° C.

Remarks:
    (1) Clear melt at 270 C.
    (2) Crystallized to a hard, brittle, white polymer
    (3) Threads pulled from melt crystallized in air.
    (4) Intrinsic viscosity, 0.30
    (5) Melting point, 251° C.

*Example 31.—90% ethyl $Z_{22}$ and 10% ethyl $Z_{s-202}$*

Reactants:
    4,4'-bis-($\beta$-hydroxyethyl)-biphenyl-bis - (ethyl carbonate) (5.8 g. or 90 mol percent)
    4,4'-bis-($\beta$-hydroxyethoxy)- diphenylsulfone - bis - (ethyl carbonate) (0.8 g. or 10 mol percent)

Catalyst:
    0.3 cc. of Ti butoxide solution

Time:
    I Stage, 20 minutes, 270° C.
    II Stage, 25 minutes, 270° C.

Remarks:
    (1) Clear melt at 270° C.
    (2) Crystallized to a hard, white, porcelain-like polymer
    (3) Threads pulled from the melt crystallized slower than those from Example 30
    (4) Intrinsic viscosity, 0.38
    (5) Melting point, 225° C.

*Example 32.—80% ethyl $Z_{22}$ plus 20% ethyl $Z_{s-202}$*

Reactants:
    4,4'-bis-($\beta$-hydroxyethyl)-biphenyl-bis-(ethyl carbonate) (5.1 g. or 80 mol percent)
    4,4' - bis - ($\beta$ - hydroxyethoxy) - diphenylsulfone-bis- (ethyl carbonate) (1.6 g. or 20 mol percent)

Catalyst: 0.3 cc. Ti butoxide solution

Time:
    I Stage, 20 minutes, 270° C.
    II Stage, 25 minutes, 270° C.

Remarks:
    (1) Clear melt at 270° C.
    (2) Threads and thin films were readily quenched in air.
    (3) Mass of polymer crystallized to a hard, porcelain-like material
    (4) There was a very marked difference in the rate of crystallization when compared with the polymer formed in Example 31, i. e., the 80:20 composition was much slower.
    (5) Intrinsic viscosity, 0.32
    (6) Melting point, 195° C.

*Example 33.—65% phenyl $Z_{22}$ plus 35% phenyl $Z_{S-202}$*

Reactants:
    4,4'-bis-($\beta$-hydroxyethyl)-biphenyl-bis(phenyl carbonate) (4.7 g. or 65 mole percent)
    4,4' - bis - ($\beta$ - hydroxyethoxy) - diphenylsulfone-bis-(phenyl carbonate) (3.0 g. or 35 mole percent)

Catalyst: 0.3 cc. of Ti ethoxide solution (see Example 12)

Time:
    I Stage, 30 minutes, 235° C.
    II Stage, 45 minutes, 260° C.

Remarks:
    (1) Clear melt at 260° C.
    (2) Cooled to form a white crystalline material more slowly than the product of Example 32.

*Example 34.—95% ethyl $Z_{22}$ plus 5% ethyl $Z_{11}$*

Reactants:
    4,4'-bis-($\beta$-hydroxyethyl)-biphenyl-bis-(ethyl carbonate) (6.1 g. or 95 mol percent)
    1,4-bis-(hydroxymethyl)-benzene-bis-(ethyl carbonate) (0.24 g. or 5 mol percent)

Catalyst: 0.3 cc. Ti butoxide solution

Time:
    I Stage, 20 minutes, 270° C.
    II Stage, 30 minutes, 270° C.

Remarks:
    (1) Clear melt at 270° C.
    (2) It crystallized to a white, porcelain-like material.
    (3) Intrinsic viscosity, 0.46
    (4) Melting point, 257° C.

*Example 35.—90% ethyl $Z_{22}$ plus 10% ethyl $Z_{11}$*

Reactants:
    4,4'-bis-($\beta$-hydroxyethyl)-biphenyl-bis-(ethyl carbonate) (5.8 g. or 90 mol percent)
    1,4-bis-(hydroxymethyl)-benzene-bis-(ethyl carbonate) (0.47 g. or 10 mol percent)

Catalyst: 0.3 cc. Ti butoxide solution

Time:
    I Stage, 20 minutes, 270° C.
    II Stage, 30 minutes, 270° C.

Remarks:
    (1) Clear melt at 270° C.
    (2) It crystallized to a white, porcelain-like polymer, but the rate of crystallization was slower than that for the polymer prepared in Example 34.
    (3) Intrinsic viscosity, 0.41
    (4) Melting point, 255° C.

*Example 36.—80% ethyl $Z_{22}$ plus 20% ethyl $Z_{11}$*

Reactants:
    4,4'-bis-($\beta$-hydroxyethyl)-biphenyl-bis-(ethyl carbonate) (5.1 g. or 80 mol percent)
    1,4-bis-(hydroxymethyl)-benzene-bis-(ethyl carbonate) (0.94 g. or 20 mol percent)

Catalyst: 0.3 cc. Ti butoxide solution

Time:
    Stage I, 20 minutes, 270° C.
    Stage II, 30 minutes, 270° C.

Remarks:
    (1) Clear melt at 270° C.
    (2) It crystallized to give a white, porcelain-like polymer, but the rate of crystallization was slower than that for the polymer prepared as described in Example 35.
    (3) Intrinsic viscosity, 0.52
    (4) Melting point, 237° C.

*Example 37.—50% ethyl $Z_{22}$ plus 50% ethyl $Z_{11}$*

Reactants:
    4,4'-bis-($\beta$-hydroxyethyl)-biphenyl-bis-(ethyl carbonate) (4.5 g. or 50 mol percent)
    1,4-bis-(hydroxymethyl)-benzene-bis-(ethyl carbonate) (3.2 g. or 50 mol percent)

Time:
    I Stage, 20 minutes, 270° C.
    II Stage, 35 minutes, 270° C.

Remarks:
    (1) Clear melt at 270° C.
    (2) The polymer crystallized much more slowly than the one prepared in Example 3.
    (3) Threads pulled from the melt and thin sections of the melt were quenched by air. These air-quenched materials were tough and flexible.
    (4) Intrinsic viscosity, 0.52
    (5) Melting point, 206° C.

*Example 38.—50% ethyl $Z_{22}$ plus 50% ethyl $Z_{11}$*

The procedure described in Example 37 was repeated exactly except that the reactants and catalyst were employed in 100 times the quantity and the following conditions were different:

Time:
    I Stage, 30 minutes, 235° C.
    II Stage, 45 minutes, 260° C.

The reaction was conducted with continuous stirring. The product was essentially the same as in Example 37 and possessed a higher intrinsic viscosity. This melt was extruded as a thin film (about 0.02–0.03 inch) into air whereupon it became satisfactorily quenched to form an amorphous product. This film was then drawn in perpendicular directions and heat set to form a tough, flexible film possessing excellent properties suitable for use as an electrical dielectric for condensers, as a photographic element to support a light sensitive emulsion, etc. This same melt was also extruded to form fibers which were cold drawn and heat set to produce fibers which could be formed into yarn for the manufacture of textile fabrics, etc.

*Example 39.—25% ethyl $Z_{22}$ plus 75% ethyl $Z_{11}$*

Reactants:
    4,4'-bis-($\beta$-hydroxyethyl)-biphenyl-bis-(ethyl carbonate) (1.6 g. or 25 mol percent)
    1,4-bis-(hydroxymethyl)-benzene-bis-(ethyl carbonate) (3.5 g. or 75 mol percent)

Catalyst: 0.3 cc. Ti butoxide solution

Time:
    I Stage, 20 minutes, 270° C.
    II Stage, 35 minutes, 270° C.

Remarks:
    (1) Clear melt at 270° C.
    (2) When cooled, the polymer set to a hard, tough, flexible material.
    (3) It crystallized more slowly than any of the other polymers prepared in this series.
    (4) Intrinsic viscosity, 0.38
    (5) Softening point, 207° C.

*Example 40.—5% ethyl $Z_{22}$ plus 95% ethyl $Z_{11}$*

Reactants:
    4,4' - bis - ($\beta$ - hydroxyethyl) - biphenyl - bis - (ethyl carbonate) (0.32 g. or 5 mol percent)
    1,4 - bis - (hydroxymethyl) - benzene - bis - (ethyl carbonate) (4.4 g. or 95 mol percent)

Catalyst: 0.3 cc. Ti butoxide solution

Time:
    I Stage, 20 minutes, 270° C.
    II Stage, 35 minutes, 270° C.

Remarks:
    (1) Clear melt at 270° C.
    (2) Threads pulled from the melt were easily quenched in air. Also, thin films were easily air quenched.
    (3) The mass of polymer crystallized upon cooling to room temperature
    (4) Intrinsic viscosity, 0.39
    (5) Melting point, 207° C.

*Example 41.—5% ethyl $Z_{22}$ plus 95% ethyl $Z_{11}$*

The procedure described in Example 40 was repeated exactly except that 0.1 g. of Ti tetrachloride in the form of its dimethyl ether complex was employed as the catalyst. This ether complex was prepared by slowly adding Ti tetrachloride to an excess of dimethyl ether which was cooled in an acetone-Dry Ice bath. The solid which precipitated was separated and dried in a desiccator over $P_2O_5$. The interpolycarbonate obtained was essentially the same as described in Example 40.

*Example 42.—5% ethyl $Z_{22}$ plus 95% ethyl $Z_{11}$*

The procedure described in Example 40 was repeated exactly except that 0.1 g. of the dioxane complex of Ti tetrachloride was employed as the catalyst. This complex was prepared analogously to the process described in Example 41. The interpolycarbonate produced was essentially the same as described in Example 40.

*Example 43.—5% butyl $Z_{22}$ plus 95% butyl $Z_{11}$*

Reactants:
  4,4' - bis - ($\beta$ - hydroxyethyl) - biphenyl - bis - (n-butyl carbonate) (2.1 g. or 5 mole percent)
  1,4 - bis - (hydroxymethyl) - benzene - bis - (n-butyl carbonate) (32.1 or 95 mole percent)
Catalyst: 0.3 cc. of Ti ethoxide
Time:
  I Stage, 30 minutes, 240° C.
  II Stage, 45 minutes, 260° C.
Remarks:
  (1) Clear melt at 260° C.
  (2) Properties essentially the same as Example 40

*Example 44.—95% ethyl $Z_{22}$ plus 5% ethyl $Z_{202}$*

Reactants:
  4,4' - bis - ($\beta$-hydroxyethyl)-biphenyl-bis-(ethyl carbonate) (6.1 g. or 95 mol percent)
  4,4'-bis-($\beta$-hydroxyethoxy)-biphenyl-bis-(ethyl carbonate) (0.35 g. or 5 mol percent)
Catalyst: 0.3 cc. Ti butoxide solution
Time:
  I Stage, 15 minutes, 270° C.
  II Stage, 30 minutes, 270° C.
Remarks:
  (1) Clear melt at 270° C.
  (2) Crystallized rapidly to a hard, brittle polymer
  (3) Intrinsic viscosity, 0.24
  (4) Melting point, 230° C.

*Example 45.—90% ethyl $Z_{22}$ plus 10% ethyl $Z_{202}$*

Reactants:
  4,4'-bis-($\beta$-hydroxyethyl)-biphenyl-bis-(ethyl carbonate) (5.8 g. or 90 mol percent)
  4,4'-bis-($\beta$-hydroxyethoxy)-biphenyl-bis-(ethyl carbonate) (0.7 g. or 10 mol percent)
Catalyst: 0.3 cc. Ti butoxide solution
Time:
  I Stage, 15 minutes, 270° C.
  II Stage, 30 minutes, 270° C.
Remarks:
  (1) Clear melt at 270° C.
  (2) Crystallized rapidly to a hard, brittle polymer
  (3) Intrinsic viscosity, 0.53
  (4) Melting point, 230° C.

*Example 46.—80% ethyl $Z_{22}$ plus 20% ethyl $Z_{202}$*

Reactants:
  4,4'-bis-($\beta$-hydroxyethyl)-biphenyl-bis-(ethyl carbonate) (5.1 g. or 80 mol percent)
  4,4'-bis-($\beta$-hydroxyethoxy)-biphenyl-bis-(ethyl carbonate) (1.4 g. or 20 mol percent)
Catalyst: 0.3 cc. Ti butoxide solution
Time:
  I Stage, 15 minutes, 270° C.
  II Stage, 30 minutes, 270° C.

Remarks:
  (1) Clear melt at 270° C.
  (2) Crystallized rapidly to a hard, brittle polymer
  (3) Intrinsic viscosity, 0.51
  (4) Melting point, 230° C.

*Example 47.—50% ethyl $Z_{22}$ plus 50% ethyl $Z_{202}$*

Reactants:
  4,4'-bis-($\beta$-hydroxyethyl)-biphenyl-bis-(ethyl carbonate) (4.5 g. or 50 mol percent)
  4,4'-bis-($\beta$-hydroxyethoxy)-biphenyl-bis-(ethyl carbonate) (4.9 g. or 50 mol percent)
Catalyst: 0.3 cc. Ti butoxide solution
Time:
  I Stage, 15 minutes, 270° C.
  II Stage, 35 minutes, 270° C.
Remarks:
  (1) Clear melt at 270° C.
  (2) Crystallized to a hard, brittle polymer
  (3) Threads pulled from the melt crystallized in air
  (4) Intrinsic viscosity, 0.49
  (5) Melting point, 215° C.

*Example 48.—25% ethyl $Z_{22}$ plus 75% ethyl $Z_{202}$*

Reactants:
  4,4'-bis-($\beta$-hydroxyethyl)-biphenyl-bis-(ethyl carbonate) (1.6 g. or 25 mol percent)
  4,4'-bis-($\beta$-hydroxyethoxy)-biphenyl-bis-(ethyl carbonate) (5.2 g. or 75 mol percent)
Catalyst: 0.3 cc. Ti butoxide solution
Time:
  I Stage, 15 minutes, 270° C.
  II Stage, 35 minutes, 270° C.
Remarks:
  (1) Clear melt at 270° C.
  (2) Crystallized rapidly to a hard, brittle polymer
  (3) Intrinsic viscosity, 0.39
  (4) Melting point, 218° C.

*Example 49.—5% ethyl $Z_{22}$ plus 95% ethyl $Z_{202}$*

Reactants:
  4,4'-bis-($\beta$-hydroxyethyl)-biphenyl-bis-(ethyl carbonate) (0.34 g. or 5 mol percent)
  4,4'-bis-($\beta$-hydroxyethoxy)-biphenyl-bis-(ethyl carbonate) (6.6 g. or 95 mol percent)
Catalyst: 0.3 cc. Ti butoxide solution
Time:
  I Stage, 15 minutes, 270° C.
  II Stage, 40 minutes, 270° C.
Remarks:
  (1) Clear melt at 270° C.
  (2) Crystallized rapidly to a hard, porcelain-like material
  (3) Intrinsic viscosity, 0.40
  (4) Melting point, 227° C.

The interpolycarbonates of this invention can be prepared employing other catalysts and other reaction conditions in a manner analogous to that described in the preceding examples within the scope of the ranges and limits set forth hereinbefore.

The photographic films which can be produced according to this invention advantageously comprise a film support prepared from one of the above-described interpolycarbonates upon which is deposited one or more layers of a silver halide emulsion which can contain appropriate sensitizers or other additives to suit the intended photographic use.

It is to be noted that interpolycarbonates prepared from alkyl or aryl $Z_{22}$ plus alkyl or aryl $Z_{12}$ are covered by the co-pending application, Serial No. 407,806, filed on even date herewith by Delbert D. Reynolds and John Van Den Berghe.

We claim:
1. A process for preparing an interpolycarbonate which comprises (A) co-condensing a mixture consist- ing of at least 5 mole percent of a primary bis-(carbonate) monomer having the following formula:

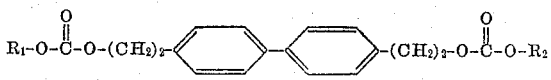

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer selected from the group consisting of those having the following formulas:

| Chemical Formula | Designation |
|---|---|
| $R_1O-CO-O-R_3-O-CO-OR_2$ | (a) |
| $R_1-O-CO-O-(CH_2)_2-O-\langle\rangle-O-(CH_2)_2-O-CO-OR_2$ | (b) |
| $R_1O-CO-O-(CH_2)_2-O-\langle\rangle-SO_2-\langle\rangle-O-(CH_2)_2-O-CO-OR_2$ | (c) |
| $R_1O-CO-O-CH_2-\langle\rangle-CH_2-O-CO-OR_2$ | (d) |
| $R_1O-CO-O-(CH_2)_2-O-\langle\rangle-\langle\rangle-O-(CH_2)_2-O-CO-OR_2$ | (e) | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (a) and (b) being employed in amounts up to 50 mole percent, (c) being employed in an amount up to 40 mole percent and (d) and (e) being employed in amounts up to 95 mole percent, (B) in the presence of an ester-interchange catalyst containing titanium as the metallic element, which catalyst is selected from the group consisting of $Ti(OR')_4$, and ether complexes of $TiX_4$ wherein the ether complexes are derived by reacting $TiX_4$ with an ether selected from the group consisting of aliphatic and alicyclic ethers containing from 2 to 12 carbon atoms, and wherein $R'$ represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 225° C.

3. A process as defined in claim 2 wherein the ester-interchange catalyst is employed in an amount of from about 0.005% to about 0.2% based on the weight of the mixture of bis(carbonate) monomers.

4. A process as defined in claim 3 wherein the low pressure is less than about 1 mm. of Hg pressure.

5. A process as defined in claim 4 wherein the primary bis(carbonate)monomer is 4,4'-bis-(β-hydroxyethyl)-biphenyl-bis-(ethyl carbonate).

6. A process as defined in claim 5 wherein the copolymerizable bis-(carbonate) monomer is 1,5-pentanediol-bis-(ethyl carbonate).

7. A processs as defined in claim 5 wherein the copolymerizable bis-(carbonate) monomer is 1,4-bis(β-hydroxyethoxy)-benzene-bis(ethyl carbonate).

8. A process as defined in claim 5 wherein the copolymerizable bis-(carbonate) monomer is 4,4'-bis-(β-hydroxyethoxy)-diphenylsulfone-bis-(ethyl carbonate).

9. A process as defined in claim 5 wherein the copolymerizable bis-(carbonate) monomer is 1,4-bis-(hydroxymethyl)-benzene-bis-(ethyl carbonate).

10. A process as defined in claim 5 wherein the copolymerizable bis-(carbonate) monomer is 4,4'-bis-(β-hydroxyethoxy)-biphenyl-bis-(ethyl carbonate).

11. Linear highly polymeric crystalline interpolycarbonates containing at least 5 mole percent of the following repeating units:

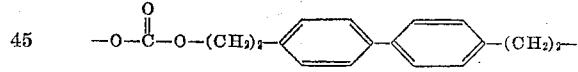

wherein the units are interspersed with at least 5 mole percent of a copolymerized unit selected from the group consisting of those having the following formulas:

| Chemical Formula | Designation |
|---|---|
| $-O-C(O)-O-R_3-$ | (a) |
| $-O-C(O)-O-(CH_2)_2-O-\langle\rangle-O-(CH_2)_2-$ | (b) |
| $-O-C(O)-O-(CH_2)_2-O-\langle\rangle-SO_2-\langle\rangle-O-(CH_2)_2-$ | (c) |
| $-O-C(O)-O-CH_2-\langle\rangle-CH_2-$ | (d) |
| $-O-C(O)-O-(CH_2)_2-O-\langle\rangle-\langle\rangle-O-(CH_2)_2-$ | (e) | wherein $R_3$ represents an alkylene radical containing from 4 to 10 carbon atoms, (a) and (b) being present in amounts up to 50 mole percent, (c) being present in an amount up to 40 mole percent, and (d) and (e) being present in amounts up ot 95 mole percent, and one end of each polymer molecule contains an $R_1-$ radical attached to the terminal free oxygen bond and the other end of each polymer molecule contains

—O—CO—O—R₂ radical attached to the terminal free methylene bond, wherein R₁ and R₂ each represents a radical selected from the group consisting of lower alkyl radicals containing from 1 to 4 carbon atoms and aryl radicals of the benzene series containing from 6 to 8 carbon atoms.

12. An interpolycarbonate as defined in claim 11 wherein the copolymerized unit is present to the extent of from about 10 to 30% and has the formula:

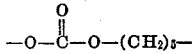

13. An interpolycarbonate as defined in claim 11 wherein the copolymerized unit is present to the extent of from about 10 to 30% and has the formula:

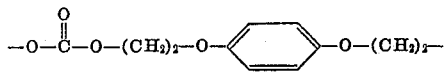

14. An interpolycarbonate as defined in claim 11 wherein the copolymerized unit is present to the extent of from about 10 to 25% and has the formula:

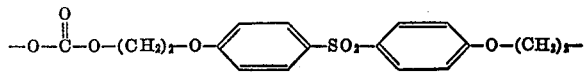

15. An interpolycarbonate as defined in claim 11 wherein the copolymerized unit is present to the extent of from about 10 to about 95% and has the formula:

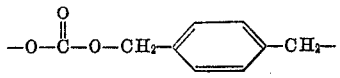

16. An interpolycarbonate as defined in claim 11 wherein the copolymerized unit is present to the extent of from about 10 to about 90% and has the formula:

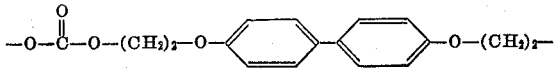

17. Fiber composed essentially of an interpolycarbonate as defined in claim 11.

18. Film composed essentially of an interpolycarbonate as defined in claim 11.

References Cited in the file of this patent

UNITED STATES PATENTS 2,210,817    Peterson _____ Aug. 6, 1940